(12) United States Patent
Akulshin et al.

(10) Patent No.: US 11,523,033 B2
(45) Date of Patent: Dec. 6, 2022

(54) CAMERA MOUNT ASSEMBLY FOR INCREMENTAL ANGLE MEASUREMENT IN THREE AXES

(71) Applicant: Volvo Car Corporation, Gothenburg (SE)

(72) Inventors: Roman Akulshin, San Francisco, CA (US); John Downs, Simi Valley, CA (US); Sihao Ding, Sunnyvale, CA (US); Harshavardhan Reddy Dasari, Sunnyvale, CA (US)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/123,394

(22) Filed: Dec. 16, 2020

(65) Prior Publication Data

US 2022/0191358 A1 Jun. 16, 2022

(51) Int. Cl.
*H04N 7/18* (2006.01)
*H04N 5/225* (2006.01)
(Continued)

(52) U.S. Cl.
CPC ......... *H04N 5/2253* (2013.01); *F16M 11/125* (2013.01); *F16M 11/126* (2013.01);
(Continued)

(58) Field of Classification Search
CPC ............. H04N 5/2253; H04N 5/23299; F16M 11/125; F16M 11/126; F16M 11/128;
(Continued)

(56) References Cited

U.S. PATENT DOCUMENTS 4,341,452 A 7/1982 Korling
5,028,997 A * 7/1991 Elberbaum ............ F16M 11/10
396/419
(Continued)

FOREIGN PATENT DOCUMENTS

CN 109373974 A 2/2019
EP 3360799 A1 8/2018
(Continued)

OTHER PUBLICATIONS

May 4, 2020 European Search Report issued in International Application No. 21214252.

*Primary Examiner* — Robert Chevalier
(74) *Attorney, Agent, or Firm* — Clements Bernard Walker; Christopher L. Bernard (57) ABSTRACT

A camera mount assembly for holding a camera or other perception sensor that may be fixed with respect to a ground plane and used for incremental angle measurement of the camera or other perception sensor in three axes, such that the precise spatial relationships of imaged objects with respect to the orientation/position of the camera or other perception sensor may be determined. A base structure of the camera mount assembly may be affixed to a fixed or moveable support structure and multiple leveling devices and/or laser devices are provided to establish a reliable reference relative to the ground plane. Thus, the exact orientation of the camera or other perception sensor in space may be determined frame to frame, such that the precise orientation of imaged objects with respect to the orientation/position of the camera or other perception sensor relative to the ground plane may be determined over time.

18 Claims, 5 Drawing Sheets

(51) Int. Cl.
  *G06T 7/70* (2017.01)
  *H04N 5/232* (2006.01)
  *G06N 20/00* (2019.01)
  *F16M 11/12* (2006.01)
(52) U.S. Cl.
  CPC .......... *F16M 11/128* (2013.01); *G06N 20/00* (2019.01); *G06T 7/70* (2017.01); *H04N 5/23299* (2018.08); *F16M 2200/066* (2013.01); *G06T 2207/20081* (2013.01)
(58) Field of Classification Search
  CPC ................ F16M 2200/066; G06T 7/70; G06T 2207/20081; G06N 20/00
  USPC ......... 348/135, 142, 143, 148; 386/210, 227
  See application file for complete search history.

(56) References Cited

U.S. PATENT DOCUMENTS

| | | |
|---|---|---|
| 5,900,925 A | 5/1999 | Navarro |
| 2009/0022369 A1 | 1/2009 | Satoh et al. |
| 2017/0363881 A1* | 12/2017 | Stec .......................... G02B 7/00 |
| 2018/0113462 A1 | 4/2018 | Fenn et al. |
| 2020/0074675 A1 | 3/2020 | Cejka et al. |

FOREIGN PATENT DOCUMENTS

| | | | |
|---|---|---|---|
| JP | 207850659 U | * | 9/2018 |
| JP | 106564267 B | * | 11/2019 |
| JP | 113720777 A | * | 11/2021 |

\* cited by examiner

CAMERA MOUNT ASSEMBLY FOR INCREMENTAL ANGLE MEASUREMENT IN THREE AXES

TECHNICAL FIELD

The present disclosure relates generally to the automotive, driver assist, and autonomous driving fields. More particularly, the present disclosure relates to a camera mount assembly for incremental angle measurement in three axes.

BACKGROUND

In the training, calibration, and operation of driver assist and autonomous driving systems utilizing a camera or other perception sensor it is often important establish the exact orientation of a ground plane adjacent to a vehicle and various objects with respect to that ground plane. The determination of these spatial relationships are necessarily affected by the orientation of the camera or other perception sensor with respect to the ground plane.

For example, most, if not all, publicly-available computer vision datasets for driver assist and autonomous driving systems assume a flat ground plane and hence zero rotation of adjacent objects about the x and y axes. Thus, it may be possible to rotate a camera or other perception sensor imaging the ground plane and adjacent objects about all three axes, x, y, and z, during imaging and thereby determine the precise spatial relationships of the adjacent objects with respect to the orientation/position of the camera or other perception sensor. In this manner, a more robust computer vision dataset may be provided with known angles of rotation of the adjacent objects with respect to the orientation/position of the camera or other perception sensor, but only if precise x, y, and z-rotation angles of the camera or other perception sensor with respect to the ground pane are known. Such a computer vision dataset may then serve as a ground truth for the evaluation of various computer vision algorithms.

The present background is provided only as context and environment in which the concepts of the present disclosure may be implemented. It will be readily apparent to those of ordinary skill in the art that these concepts may be implemented in other contexts and environments equally. For example, the camera mount assembly may be used in non-automotive, driver assist, and autonomous driving applications as well.

SUMMARY

The present disclosure provides a camera mount assembly for holding a camera or other perception sensor that may be fixed with respect to a ground plane and used for incremental angle measurement of the camera or other perception sensor in three axes, such that the precise spatial relationships of imaged objects with respect to the orientation/position of the camera or other perception sensor may be determined. The camera mount assembly is capable of making angle adjustments and measurement in all three axes individually or simultaneously in single-degree increments, or in even finer increments. A base structure of the camera mount assembly may be affixed to a support structure or other fixed or moveable structure and multiple leveling devices and/or laser devices are provided to establish a reliable reference relative to the ground plane. Thus, the exact orientation of the camera or other perception sensor in space relative to the ground plane may be determined frame to frame, such that the precise orientation of imaged objects with respect to the orientation/position of the camera or other perception sensor may be determined over time, providing a ground truth for the evaluation of various computer vision algorithms.

In one illustrative embodiment, the present disclosure provides a camera mount assembly for holding a camera or other perception sensor, comprising: a base structure adapted to be coupled to a support structure; a first rotational adjustment mechanism coupled to the base structure and adapted to rotate the camera or other perception sensor with respect to the base structure about a first axis; a second rotational adjustment mechanism coupled to the first rotational adjustment mechanism and adapted to rotate the camera or other perception sensor with respect to the base structure about a second axis that is perpendicular to the first axis; and a third rotational adjustment mechanism coupled to the second rotational adjustment mechanism and adapted to rotate the camera or other perception sensor with respect to the base structure about a third axis that is perpendicular to the second axis. The second rotational adjustment mechanism is coupled to the first rotational adjustment mechanism by an arm structure disposed at an angle to the first axis and the second axis. The third rotational adjustment mechanism is coupled to the second rotational adjustment mechanism by a planar structure disposed along the second axis perpendicular to the third axis. The planar structure defines an aperture disposed about the third axis in which at least a portion of the third rotational adjustment mechanism is disposed. The third rotational adjustment mechanism is disposed with respect to the first rotational adjustment mechanism such that the third axis intersects the first axis. The camera or other perception sensor is secured to the third rotational adjustment mechanism. The camera or other perception sensor is secured concentrically within the third rotational adjustment mechanism. Each of the first rotational adjustment mechanism, the second rotational adjustment mechanism, and the third rotational adjustment mechanism comprises a visible marking scale for determining a degree of rotation of the respective rotational adjustment mechanism with respect to the base structure. Alternatively, each of the first rotational adjustment mechanism, the second rotational adjustment mechanism, and the third rotational adjustment mechanism comprises a rotational sensor for determining a degree of rotation of the respective rotational adjustment mechanism with respect to the base structure. The base structure comprises one or more of a leveling device and a laser device for establishing a predetermined orientation of the base structure with respect to a ground plane.

In another illustrative embodiment, the present disclosure provides a method for imaging an object, comprising: coupling a camera mount assembly to a support structure, the camera mount assembly holding a camera or other perception sensor, the camera mount assembly comprising: a base structure adapted to be coupled to the support structure; a first rotational adjustment mechanism coupled to the base structure and adapted to rotate the camera or other perception sensor with respect to the base structure about a first axis; a second rotational adjustment mechanism coupled to the first rotational adjustment mechanism and adapted to rotate the camera or other perception sensor with respect to the base structure about a second axis that is perpendicular to the first axis; and a third rotational adjustment mechanism coupled to the second rotational adjustment mechanism and adapted to rotate the camera or other perception sensor with respect to the base structure about a third axis that is perpendicular to the second axis; aligning the base structure of the camera mount assembly with respect to a ground plane; adjusting and recording an orientation of the camera or other perception sensor using one or more of the first rotational adjustment mechanism, the second rotational adjustment mechanism, and the third rotational adjustment mechanism of the camera mount assembly; imaging the object using the camera or other perception sensor; and determining an orientation of the object with respect to the orientation/a position of the camera or other perception sensor using the recorded orientation of the camera or other perception sensor relative to the ground plane. The method further includes determining a distance between the camera or other perception sensor and the object of interest and determining a position of the object with respect to the ground plane. The method further includes determining a distance between the camera or other perception sensor and the ground plane and determining a height of the object with respect to the ground plane. The second rotational adjustment mechanism is coupled to the first rotational adjustment mechanism by an arm structure disposed at an angle to the first axis and the second axis. The third rotational adjustment mechanism is coupled to the second rotational adjustment mechanism by a planar structure disposed along the second axis perpendicular to the third axis. The third rotational adjustment mechanism is disposed with respect to the first rotational adjustment mechanism such that the third axis intersects the first axis. The camera or other perception sensor is secured to the third rotational adjustment mechanism. The base structure comprises one or more of a leveling device and a laser device for establishing a predetermined orientation of the base structure with respect to a ground plane.

In a further illustrative embodiment, the present disclosure provides a method for training a driver assist or autonomous driving system using an imaged object, comprising: coupling a camera mount assembly to a support structure, the camera mount assembly holding a camera or other perception sensor, the camera mount assembly comprising: a base structure adapted to be coupled to the support structure; a first rotational adjustment mechanism coupled to the base structure and adapted to rotate the camera or other perception sensor with respect to the base structure about a first axis; a second rotational adjustment mechanism coupled to the first rotational adjustment mechanism and adapted to rotate the camera or other perception sensor with respect to the base structure about a second axis that is perpendicular to the first axis; and a third rotational adjustment mechanism coupled to the second rotational adjustment mechanism and adapted to rotate the camera or other perception sensor with respect to the base structure about a third axis that is perpendicular to the second axis; aligning the base structure of the camera mount assembly with respect to a ground plane; adjusting and recording an orientation of the camera or other perception sensor using one or more of the first rotational adjustment mechanism, the second rotational adjustment mechanism, and the third rotational adjustment mechanism of the camera mount assembly; imaging an object using the camera or other perception sensor; determining an orientation of the imaged object with respect to the orientation/a position of the camera or other perception sensor using the recorded orientation of the camera or other perception sensor relative to the ground plane; and providing the imaged object to the driver assist or autonomous driving system. The driver assist or autonomous driving system executes a machine learning algorithm.

BRIEF DESCRIPTION OF THE DRAWINGS

The present disclosure is illustrated and described herein with reference to the various drawings, in which like reference numbers are used to denote like assembly components/method steps, as appropriate, and in which.

DETAILED DESCRIPTION

The present disclosure provides a camera mount assembly for holding a camera or other perception sensor that may be fixed with respect to a ground plane and used for incremental angle measurement of the camera or other perception sensor in three axes, such that the precise spatial relationships of imaged objects with respect to the orientation/position of the camera or other perception sensor may be determined. The camera mount assembly is capable of making angle adjustments and measurement in all three axes individually or simultaneously in single-degree increments, or in even finer increments. A base structure of the camera mount assembly may be affixed to a support structure or other fixed or moveable structure and multiple leveling devices and/or laser devices are provided to establish a reliable reference relative to the ground plane. Thus, the exact orientation of the camera or other perception sensor in space may be determined frame to frame, such that the precise orientation of imaged objects with respect to the orientation/position of the camera or other perception sensor may be determined over time, providing a ground truth for the evaluation of various computer vision algorithms.

Figure 1:
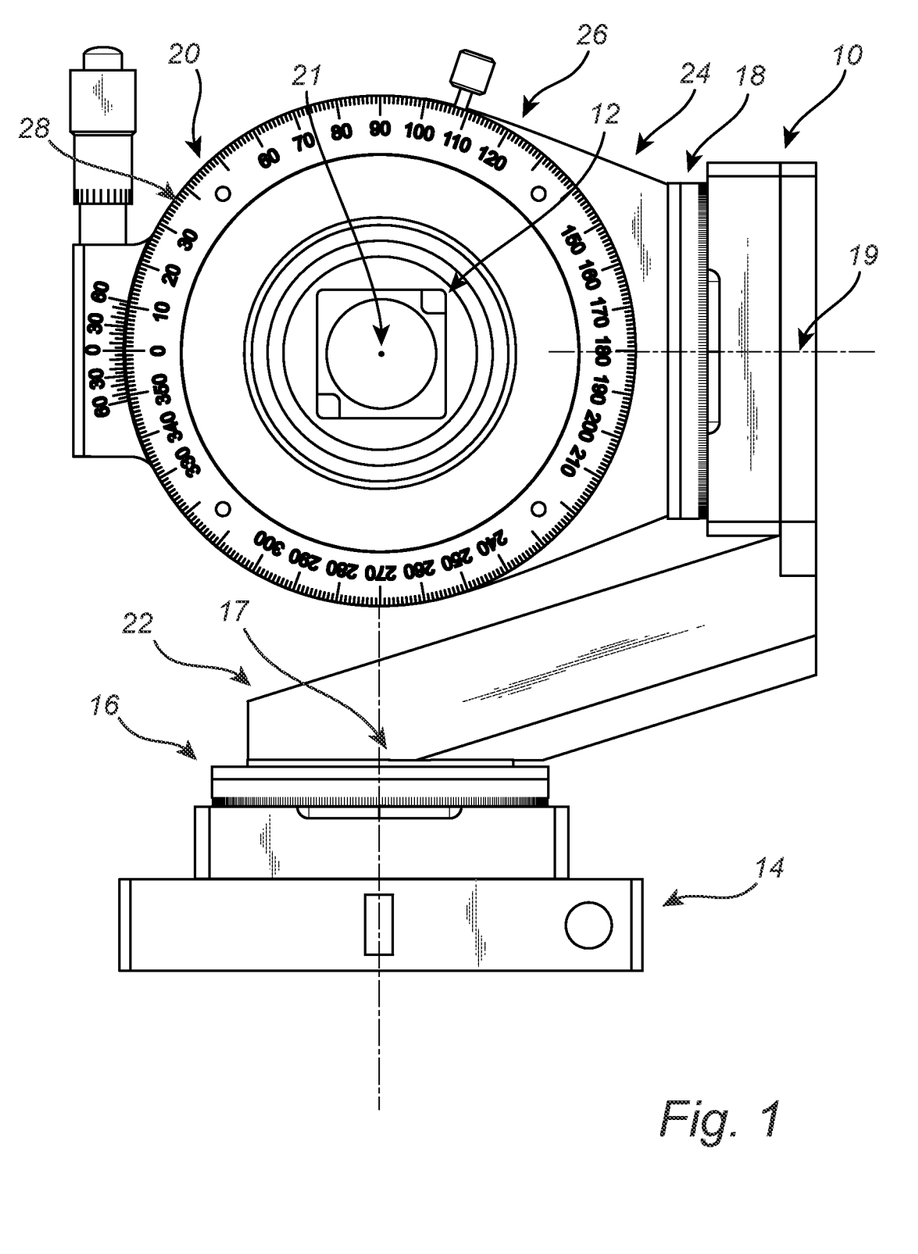
FIG. 1 is a planar view of one illustrative embodiment of the camera mount assembly of the present disclosure.

Referring now specifically to FIG. 1, in one illustrative embodiment, the camera mount assembly 10 is adapted to securely hold a camera or other perception sensor 12, such as a camera or other perception sensor 12 used to generate an image dataset for training a driver assist or autonomous driving system or the like. In such an image dataset, it is helpful to know the exact orientations and positions of various imaged objects with respect to the orientation/position of the camera or other perception sensor, thereby providing a ground truth for training. Measurement of these orientations and positions is dependent upon the orientation of the camera or other perception sensor 12 with respect to the ground plane. The camera mount assembly 10 includes a base structure 14 adapted to be coupled to a support structure, such as a typical camera tripod that has an adjustable height or the like. This base structure 14 is aligned precisely parallel (or at a predetermined angle) to the ground plane, as is described in greater detail herein below.

A first rotational adjustment mechanism 16 is coupled to the base structure 14 and is adapted to rotate the camera or other perception sensor 12 with respect to the base structure 14 about a first axis 17. This first rotational adjustment mechanism 16 may provide full 360-degree (or a lesser degree of) rotational/pivotable motion, which may be continuous or stepwise in degree or fraction-of-a-degree increments, for example. Adjustment may be mechanical or electrically-assisted, with optional coarse and fine adjustments being possible. A second rotational adjustment mechanism 18 is coupled to the first rotational adjustment mechanism 16 and is adapted to rotate the camera or other perception sensor 12 with respect to the base structure 14 about a second axis 19 that is perpendicular to the first axis 17. This second rotational adjustment mechanism 18 may also provide full 360-degree (or a lesser degree of) rotational/pivotable motion, which may be continuous or stepwise in degree or fraction-of-a-degree increments, for example. Adjustment may be mechanical or electrically-assisted, with optional coarse and fine adjustments being possible. A third rotational adjustment mechanism 20 is coupled to the second rotational adjustment mechanism 18 and is adapted to rotate the camera or other perception sensor 12 with respect to the base structure 14 about a third axis 21 that is perpendicular to the second axis 19. This third rotational adjustment mechanism 20 may further provide full 360-degree (or a lesser degree of) rotational/pivotable motion, which may be continuous or stepwise in degree or fraction-of-a-degree increments, for example. Adjustment may be mechanical or electrically-assisted, with optional coarse and fine adjustments being possible.

The second rotational adjustment mechanism 18 is coupled to the first rotational adjustment mechanism 16 by an arm structure 22 disposed at an angle to the first axis 17 and the second axis 19. The arm structure 22 may be manufactured from a metal, a plastic, or another substantially rigid material, and may have any suitable cross-sectional shape. The third rotational adjustment mechanism 20 is coupled to the second rotational adjustment mechanism 18 by a planar structure 24 disposed along the second axis 19 perpendicular to the third axis 21. The planar structure 24 defines an aperture 26 disposed about the third axis 21 in which at least a portion of the third rotational adjustment mechanism 20 is disposed. It will be readily apparent to those of ordinary skill in the art that the planar structure 24 may be replaced by an arm structure that suitably holds and supports the third rotational adjustment mechanism 20 with respect to the second rotational adjustment mechanism 18.

Optionally, the third rotational adjustment mechanism 20 is disposed with respect to the first rotational adjustment mechanism 16 such that the third axis 21 intersects the first axis 17. The camera or other perception sensor 12 is secured to the third rotational adjustment mechanism 20. Optionally, the camera or other perception sensor 12 is secured concentrically within the third rotational adjustment mechanism 20, such that the third rotational adjustment mechanism 20 acts as a rotating frame for the camera or other perception sensor 12 as it is pitched and yawed by the second rotational adjustment mechanism 18 and the first rotational adjustment mechanism 16, respectively.

Each of the first rotational adjustment mechanism 16, the second rotational adjustment mechanism 18, and the third rotational adjustment mechanism 20 comprises a visible marking scale 28 for determining a degree of rotation of the respective rotational adjustment mechanism 16, 18, 20 with respect to the base structure 14. Alternatively, each of the first rotational adjustment mechanism 16, the second rotational adjustment mechanism 18, and the third rotational adjustment mechanism 20 comprises a rotational sensor for determining a degree of rotation of the respective rotational adjustment mechanism 16, 18, 20 with respect to the base structure 14. The base structure 14 comprises one or more of a leveling device 30 (FIGS. 3 and 4) and a laser device 32 (FIGS. 3 and 4) for establishing a predetermined orientation of the base structure 14 with respect to the ground plane. The leveling device 30 indicates the horizontal inclination of the base structure 14 based on gravity, while the laser device 32 allows projections to be made to adjacent walls or other planar structures by which the base structure can be oriented and aligned.

Referring now specifically to FIG. 2, again, the camera mount assembly 10 is adapted to securely hold the camera or other perception sensor 12, such as the camera or other perception sensor 12 used to generate an image dataset for training a driver assist or autonomous driving system or the like, while the camera or other perception sensor 12 is aligned in terms of roll, pitch, and yaw. The camera mount assembly 10 includes the base structure 14 adapted to be coupled to a support structure, such as a typical camera tripod that has an adjustable height or the like. This base structure 14 is aligned precisely parallel (or at a predetermined angle) to the ground plane, as is described in greater detail herein below.

Figure 2:
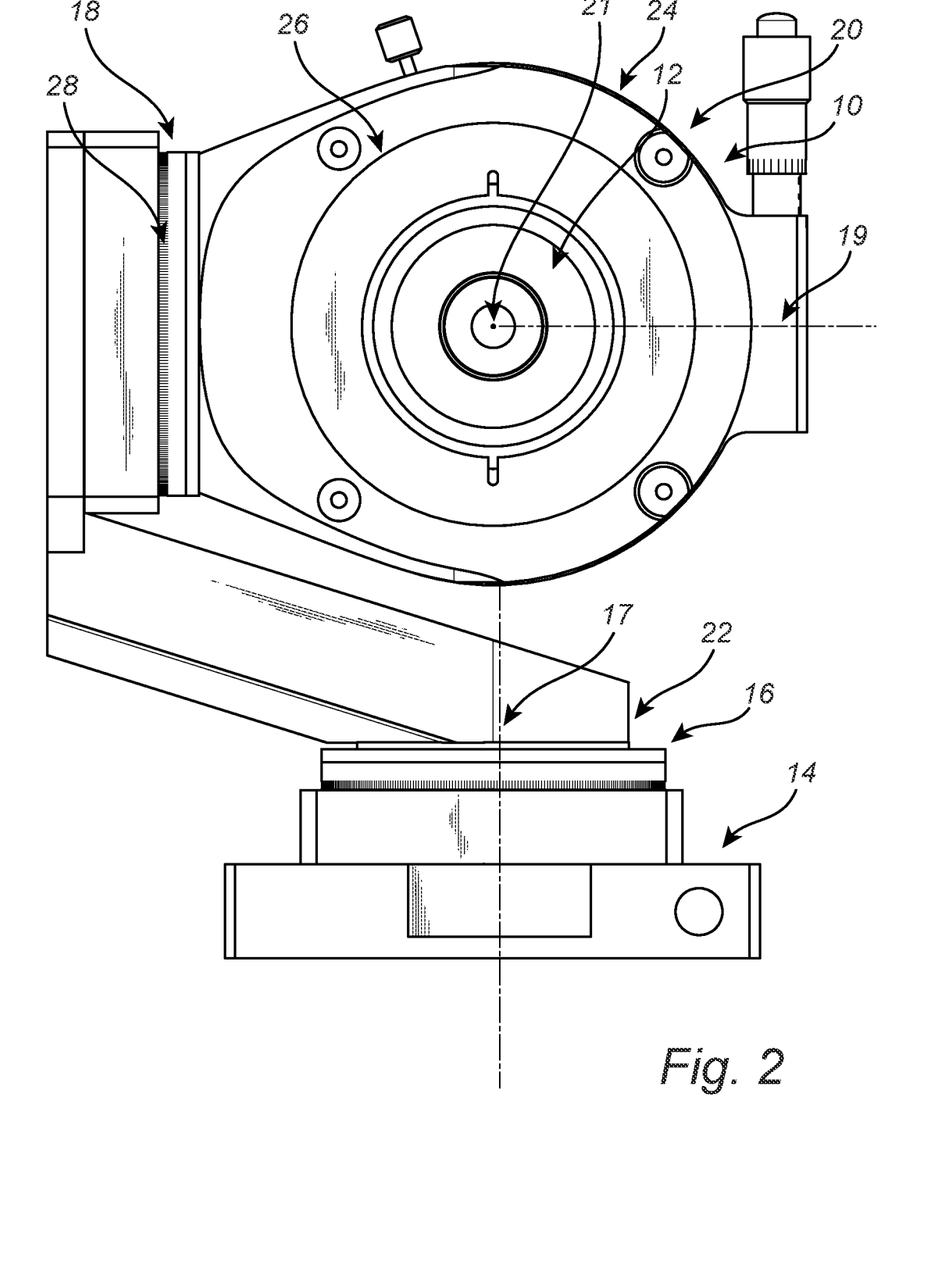
FIG. 2 is another planar view of one illustrative embodiment of the camera mount assembly of the present disclosure.

The first rotational adjustment mechanism 16 is coupled to the base structure 14 and is adapted to rotate the camera or other perception sensor 12 with respect to the base structure 14 about the first axis 17. This first rotational adjustment mechanism 16 may provide full 360-degree (or a lesser degree of) rotational/pivotable motion, which may be continuous or stepwise in degree or fraction-of-a-degree increments, for example. Adjustment may be mechanical or electrically-assisted, with optional coarse and fine adjustments being possible. The second rotational adjustment mechanism 18 is coupled to the first rotational adjustment mechanism 16 and is adapted to rotate the camera or other perception sensor 12 with respect to the base structure 14 about the second axis 19 that is perpendicular to the first axis 17. This second rotational adjustment mechanism 18 may also provide full 360-degree (or a lesser degree of) rotational/pivotable motion, which may be continuous or stepwise in degree or fraction-of-a-degree increments, for example. Adjustment may be mechanical or electrically-assisted, with optional coarse and fine adjustments being possible. The third rotational adjustment mechanism 20 is coupled to the second rotational adjustment mechanism 18 and is adapted to rotate the camera or other perception sensor 12 with respect to the base structure 14 about the third axis 21 that is perpendicular to the second axis 19. This third rotational adjustment mechanism 20 may further provide full 360-degree (or a lesser degree of) rotational/pivotable motion, which may be continuous or stepwise in degree or fraction-of-a-degree increments, for example. Adjustment may be mechanical or electrically-assisted, with optional coarse and fine adjustments being possible.

The second rotational adjustment mechanism 18 is coupled to the first rotational adjustment mechanism 16 by the arm structure 22 disposed at an angle to the first axis 17 and the second axis 19. The arm structure 22 may be manufactured from a metal, a plastic, or another substantially rigid material, and may have any suitable cross-sectional shape. The third rotational adjustment mechanism 20 is coupled to the second rotational adjustment mechanism 18 by the planar structure 24 disposed along the second axis 19 perpendicular to the third axis 21. The planar structure 24 defines an aperture 26 disposed about the third axis 21 in which at least a portion of the third rotational adjustment mechanism 20 is disposed. It will be readily apparent to those of ordinary skill in the art that the planar structure 24 may be replaced by an arm structure that suitably holds and supports the third rotational adjustment mechanism 20 with respect to the second rotational adjustment mechanism 18.

Optionally, the third rotational adjustment mechanism 20 is disposed with respect to the first rotational adjustment mechanism 16 such that the third axis 21 intersects the first axis 17. The camera or other perception sensor 12 is secured to the third rotational adjustment mechanism 20. Optionally, the camera or other perception sensor 12 is secured concentrically within the third rotational adjustment mechanism 20, such that the third rotational adjustment mechanism 20 acts as a rotating frame for the camera or other perception sensor 12 as it is pitched and yawed by the second rotational adjustment mechanism 18 and the first rotational adjustment mechanism 16, respectively.

Each of the first rotational adjustment mechanism 16, the second rotational adjustment mechanism 18, and the third rotational adjustment mechanism 20 comprises a visible marking scale 28 for determining a degree of rotation of the respective rotational adjustment mechanism 16, 18, 20 with respect to the base structure 14. Alternatively, each of the first rotational adjustment mechanism 16, the second rotational adjustment mechanism 18, and the third rotational adjustment mechanism 20 comprises a rotational sensor for determining a degree of rotation of the respective rotational adjustment mechanism 16, 18, 20 with respect to the base structure 14. The base structure 14 comprises one or more of a leveling device 30 (FIGS. 3 and 4) and a laser device 32 (FIGS. 3 and 4) for establishing a predetermined orientation of the base structure 14 with respect to the ground plane. The leveling device 30 indicates the horizontal inclination of the base structure 14 based on gravity, while the laser device 32 allows projections to be made to adjacent walls or other planar structures by which the base structure can be oriented and aligned.

Figure 3:
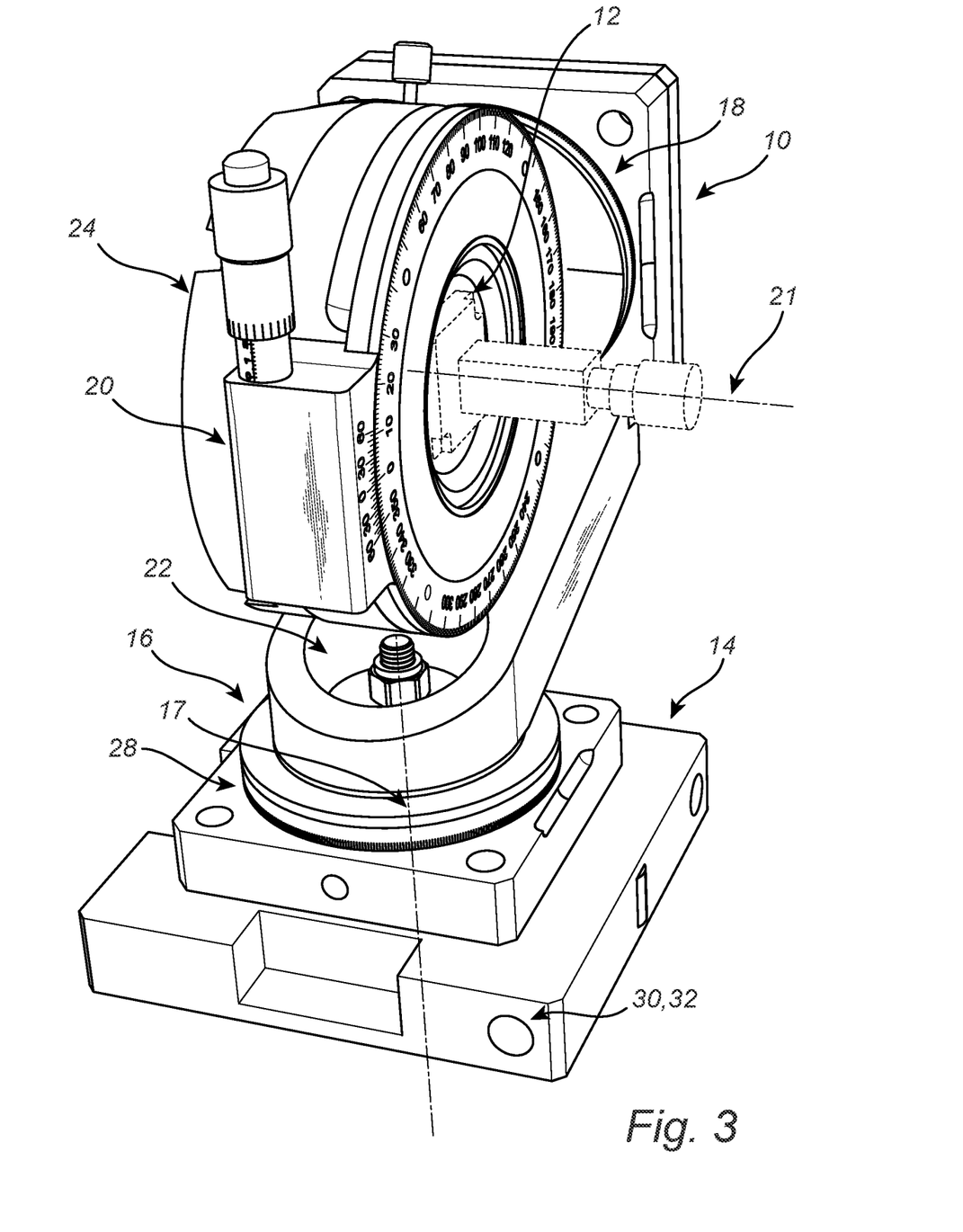
FIG. 3 is a perspective view of one illustrative embodiment of the camera mount assembly of the present disclosure.
Figure 4:
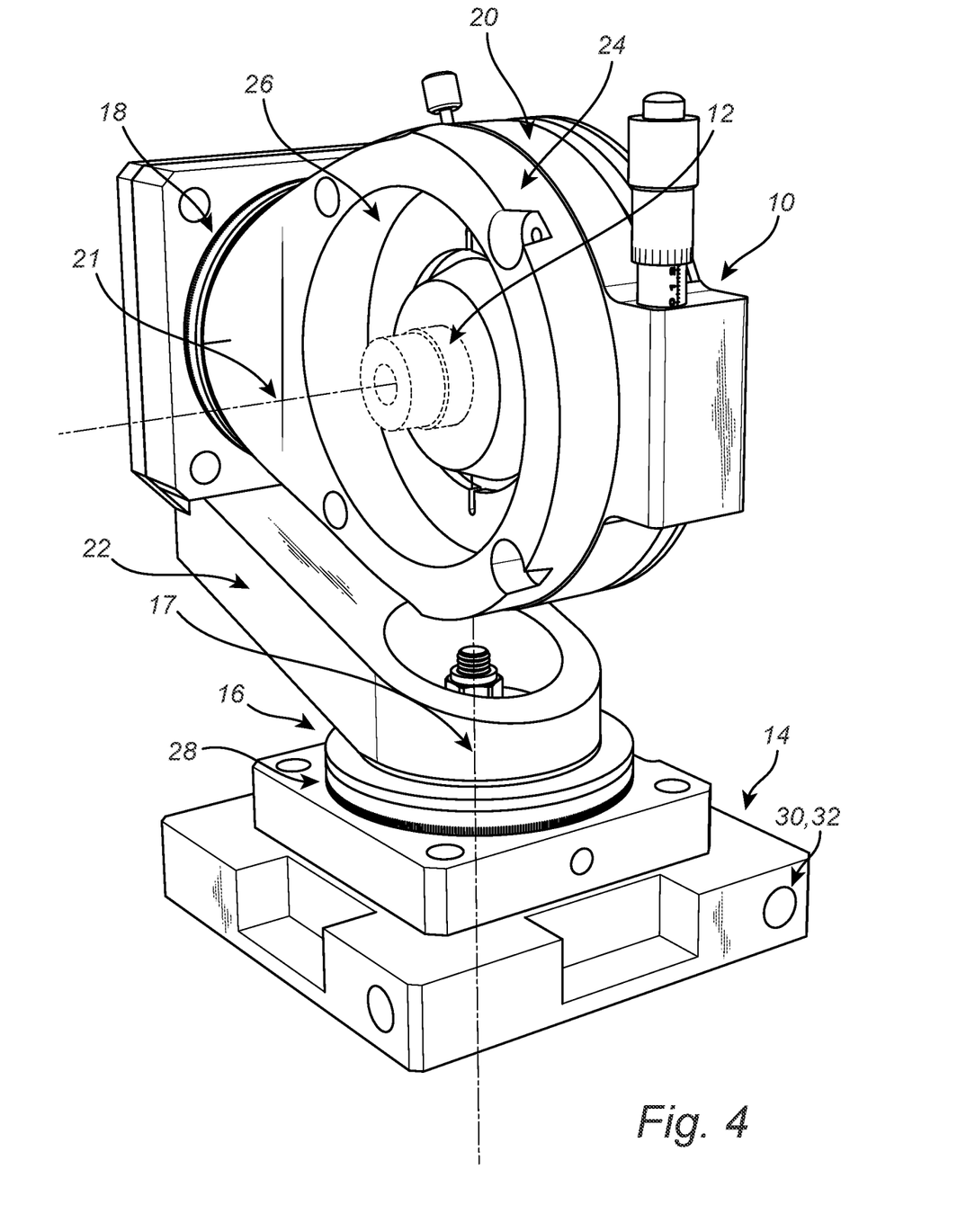
FIG. 4 is another perspective view of one illustrative embodiment of the camera mount assembly of the present disclosure.

FIGS. 3 and 4 show perspective views of the camera mount assembly 10 and camera or perception sensor assembly 12 of the present disclosure, with the base member 14, first rotational adjustment mechanism 16, arm structure 22, second rotational adjustment mechanism 18, planar structure 24, and third rotational adjustment mechanism 20 coupled in sequence. It will be readily apparent to those of ordinary skill in the art that these components may be coupled in other sequences as well, provided that the same roll, pitch, and yaw functionalities are provided. As alluded to herein above, the camera or perception sensor assembly 12 is disposed in a rotational frame or cradle formed by the third rotational adjustment mechanism 20 disposed within the aperture 26 of the planar structure 24, which is in turn coupled to the second rotational adjustment mechanism 18. The second rotational adjustment mechanism 18 is coupled to the first rotational adjustment mechanism 16 and ultimately the base structure 14 by the arm structure 22. Thus, the three axes of rotation 17, 19, 21 are provided about which the camera or perception sensor assembly 12 may pivot or rotate. It should be noted that these axes 17, 19, 21 do not necessarily share a common origin, although any number of them may intersect. They may also be offset from one another, provided that the same perpendicularity is maintained.

Figure 5:
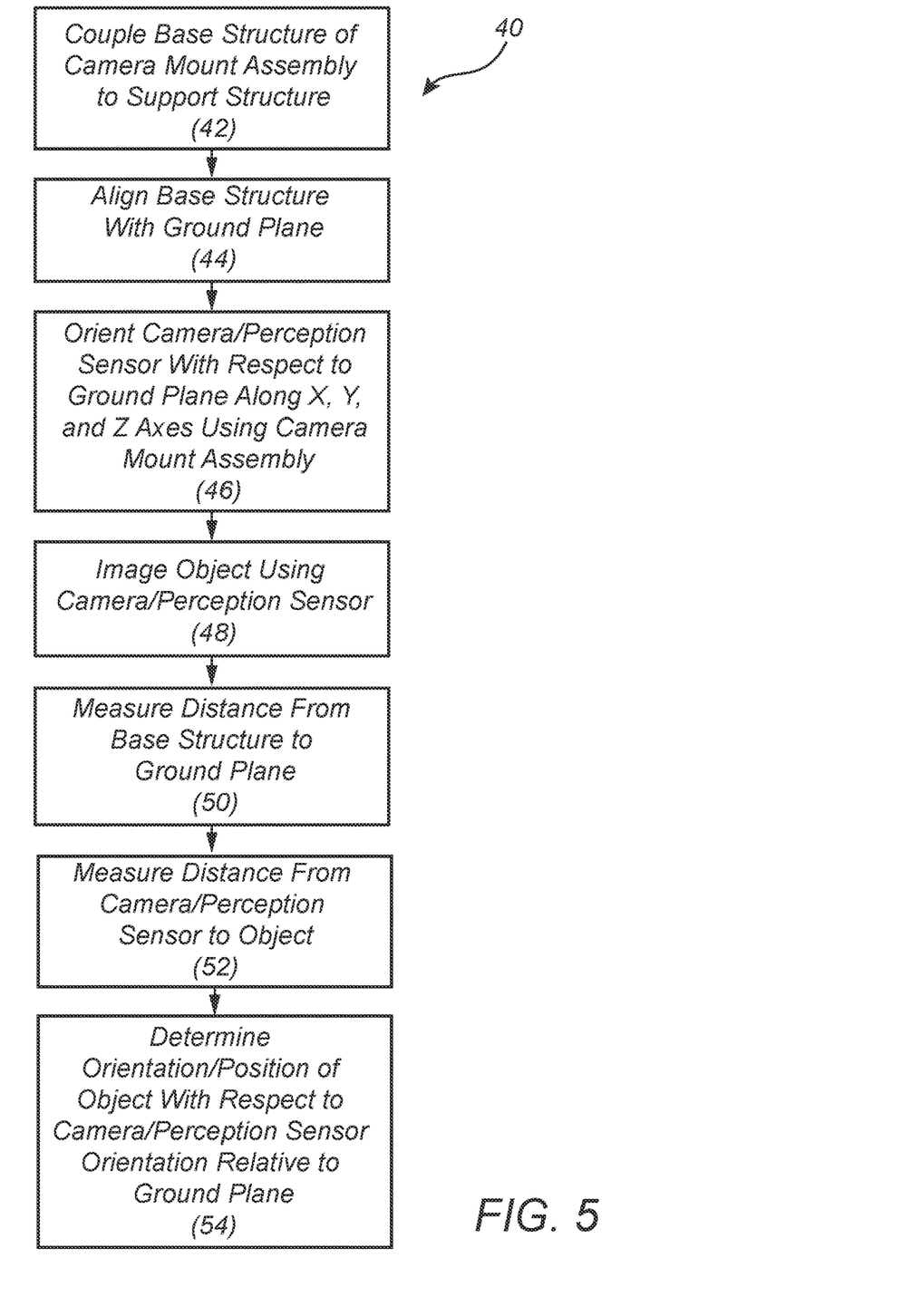
FIG. 5 is a flowchart of one illustrative embodiment of a method for imaging an object using the camera mount assembly of the present disclosure.

FIG. 5 is a flowchart of one illustrative embodiment of a method 40 for imaging an object using the camera mount assembly 10 (FIGS. 1-4) of the present disclosure. The method 40 first includes coupling the base structure 14 (FIGS. 1-4) of the camera mount assembly 10 to the support structure of choice (step 42). The method 40 next includes aligning the base structure 14 with the ground plane using the one or more leveling devices 30 (FIGS. 1-4) and/or laser devices 32 (FIGS. 1-4) (step 44). This provides a fixed frame of reference for the camera mount assembly 10. The camera or perception sensor assembly 12 (FIGS. 1-4) is then aligned as desired via actuation of the first rotational adjustment mechanism 16 (FIGS. 1-4), the second rotational adjustment mechanism 18 (FIGS. 1-4), and the third rotational adjustment mechanism 20 (FIGS. 1-4), with the established angles provided by the visible marking scale 28 (FIGS. 1-4), for example (step 46). The method 40 next includes imaging an object using the camera or perception sensor assembly 12 (step 48). The distance from the base structure 14 to the ground plane is measured to provide a reference height for the camera or perception sensor assembly 12 (step 50). The distance from the base structure 14 to the object is also measured to provide a reference distance for the object (step 52). Finally, the method 40 includes determining the orientation/position of the object with respect to the orientation/position of the camera or other perception sensor relative to the ground plane using camera/perception sensor orientation (step 54). Such oriented and positioned object images may then be used as a dataset for the training of a driver assist or autonomous driving system executing a machine learning algorithm or the like.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A camera mount assembly for holding a camera or other perception sensor, comprising:
    a base structure adapted to be coupled to a support structure;
    a first rotational adjustment mechanism coupled to the base structure and adapted to rotate the camera or other perception sensor with respect to the base structure about a first axis;
    a second rotational adjustment mechanism coupled to the first rotational adjustment mechanism and adapted to rotate the camera or other perception sensor with respect to the base structure about a second axis that is perpendicular to the first axis; and
    a third rotational adjustment mechanism coupled to the second rotational adjustment mechanism and adapted to rotate the camera or other perception sensor with respect to the base structure about a third axis that is perpendicular to the second axis;
    wherein each of the first rotational adjustment mechanism, the second rotational adjustment mechanism, and the third rotational adjustment mechanism comprises one or more of: a visible marking scale for determining a degree of rotation of the respective rotational adjustment mechanism with respect to the base structure and a rotational sensor for determining a degree of rotation of the respective rotational adjustment mechanism with respect to the base structure.

2. The camera mount assembly of claim 1, wherein the second rotational adjustment mechanism is coupled to the first rotational adjustment mechanism by an arm structure disposed at an angle to the first axis and the second axis.

3. The camera mount assembly of claim 1, wherein the third rotational adjustment mechanism is coupled to the second rotational adjustment mechanism by a planar structure disposed along the second axis perpendicular to the third axis.

4. The camera mount assembly of claim 3, wherein the planar structure defines an aperture disposed about the third axis in which at least a portion of the third rotational adjustment mechanism is disposed.

5. The camera mount assembly of claim 1, wherein the third rotational adjustment mechanism is disposed with respect to the first rotational adjustment mechanism such that the third axis intersects the first axis.

6. The camera mount assembly of claim 1, wherein the camera or other perception sensor is secured to the third rotational adjustment mechanism.

7. The camera mount assembly of claim 6, wherein the camera or other perception sensor is secured concentrically within the third rotational adjustment mechanism.

8. The camera mount assembly of claim 1, wherein the base structure comprises one or more of a leveling device and a laser device for establishing a predetermined orientation of the base structure with respect to a ground plane.

9. A method for imaging an object, comprising:
coupling a camera mount assembly to a support structure, the camera mount assembly holding a camera or other perception sensor, the camera mount assembly comprising:
a base structure adapted to be coupled to the support structure;
a first rotational adjustment mechanism coupled to the base structure and adapted to rotate the camera or other perception sensor with respect to the base structure about a first axis;
a second rotational adjustment mechanism coupled to the first rotational adjustment mechanism and adapted to rotate the camera or other perception sensor with respect to the base structure about a second axis that is perpendicular to the first axis; and
a third rotational adjustment mechanism coupled to the second rotational adjustment mechanism and adapted to rotate the camera or other perception sensor with respect to the base structure about a third axis that is perpendicular to the second axis;
aligning the base structure of the camera mount assembly with respect to a ground plane;
adjusting and recording an orientation of the camera or other perception sensor using one or more of the first rotational adjustment mechanism, the second rotational adjustment mechanism, and the third rotational adjustment mechanism of the camera mount assembly;
imaging the object using the camera or other perception sensor; and
determining an orientation of the object with respect to the orientation/a position of the camera or other perception sensor using the recorded orientation of the camera or other perception sensor relative to the ground plane.

10. The method of claim 9, further comprising determining a distance between the camera or other perception sensor and the object of interest and determining a position of the object with respect to the orientation/position of the camera or other perception sensor.

11. The method of claim 9, further comprising determining a distance between the camera or other perception sensor and the ground plane and determining a height of the object with respect to the ground plane.

12. The method of claim 9, wherein the second rotational adjustment mechanism is coupled to the first rotational adjustment mechanism by an arm structure disposed at an angle to the first axis and the second axis.

13. The method of claim 9, wherein the third rotational adjustment mechanism is coupled to the second rotational adjustment mechanism by a planar structure disposed along the second axis perpendicular to the third axis.

14. The method of claim 9, wherein the third rotational adjustment mechanism is disposed with respect to the first rotational adjustment mechanism such that the third axis intersects the first axis.

15. The method of claim 9, wherein the camera or other perception sensor is secured to the third rotational adjustment mechanism.

16. The method of claim 9, wherein the base structure comprises one or more of a leveling device and a laser device for establishing a predetermined orientation of the base structure with respect to a ground plane.

17. A method for training a driver assist or autonomous driving system using an imaged object, comprising:
coupling a camera mount assembly to a support structure, the camera mount assembly holding a camera or other perception sensor, the camera mount assembly comprising:
a base structure adapted to be coupled to the support structure;
a first rotational adjustment mechanism coupled to the base structure and adapted to rotate the camera or other perception sensor with respect to the base structure about a first axis;
a second rotational adjustment mechanism coupled to the first rotational adjustment mechanism and adapted to rotate the camera or other perception sensor with respect to the base structure about a second axis that is perpendicular to the first axis; and
a third rotational adjustment mechanism coupled to the second rotational adjustment mechanism and adapted to rotate the camera or other perception sensor with respect to the base structure about a third axis that is perpendicular to the second axis;
aligning the base structure of the camera mount assembly with respect to a ground plane;
adjusting and recording an orientation of the camera or other perception sensor using one or more of the first rotational adjustment mechanism, the second rotational adjustment mechanism, and the third rotational adjustment mechanism of the camera mount assembly;
imaging an object using the camera or other perception sensor;
determining an orientation of the imaged object with respect to the orientation/a position of the camera or other perception sensor using the recorded orientation of the camera or other perception sensor relative to the ground plane; and
providing the imaged object to the driver assist or autonomous driving system.

18. The method of claim 17, wherein the driver assist or autonomous driving system executes a machine learning algorithm.

* * * * *